H. W. PLEISTER.
CONDUIT OR CABLE CLAMP AND BRIDLE RING.
APPLICATION FILED MAY 7, 1920.

1,365,631.

Patented Jan. 11, 1921.

INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,631.  Specification of Letters Patent.  Patented Jan. 11, 1921.

Original application filed January 23, 1920, Serial No. 353,623. Divided and this application filed May 7, 1920. Serial No. 379,520.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

This application is a division of my copending application for improvement in "conduit or cable clamp and bridle ring" filed January 23, 1920, Ser. No. 353,623.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a pocket or recess formed by raising longitudinally a portion of the base above the plane of the base, thereby forming a pocket or recess which is open from the sides or at right angles to the longitudinal axis of the complete conduit or cable clamp.

My invention further relates to such a conduit or cable clamp formed from pressed sheet material in which the pocket or recess is formed by striking up a portion of the base.

My invention further relates to a wire bridle ring as a separate article of manufacture.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1:
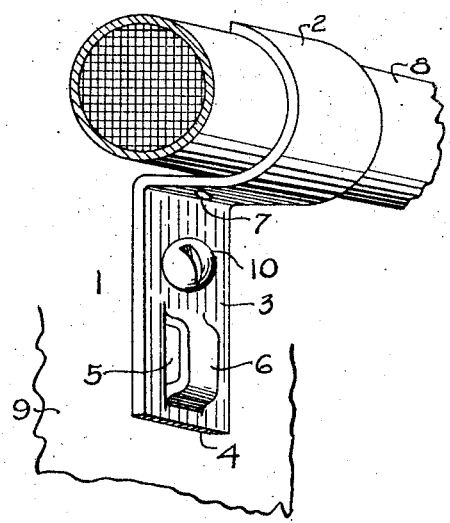
Figure 1 is a perspective view of my conduit and cable clamp and of a cable which it supports.
Figure 2:
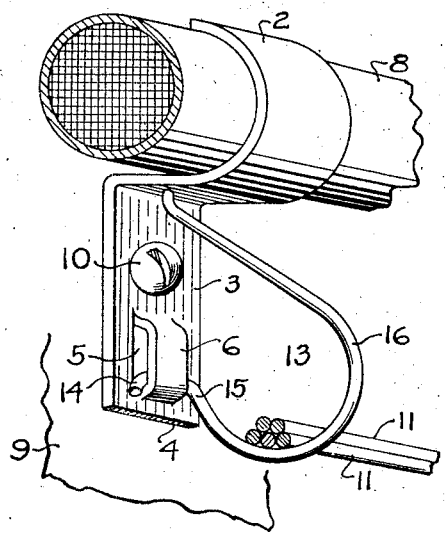
Fig. 2 is a perspective view of the conduit and cable clamp shown in Fig. 1 with the addition of a bridle ring.

In the commercial use of conduit or cable clamps it is not generally possible, at the date of the original installation, to determine whether or not bridle rings will be needed to support additional loose strands of wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal. Near the bottom 4 of the base 3 I form an integral socket or recess 5, when the clamp is formed of pressed sheet material, by striking up a portion 6 of the base so that this portion extends longitudinally of the base and is open on both sides. This socket or recess 5 is adapted to receive one end of a bridle ring. The conduit or cable clamp 1 is also provided with additional means to receive the other end of a conduit or cable clamp. I have shown in the drawings a hole or opening 7 for this purpose.

The cable is held to the wall or other suitable support 9 by means of the conduit or cable clamp 1 and the securing screw 10.

Whenever it becomes necessary to increase the capacity of the installation by stringing bridle wires 11, 11 this can be easily done by threading the hook 12 of the bridle ring 13 transversely through the open sides of the recess 5 so that the locking arm 14 of the hook 12 lies on one side of the struck up portion 6, and the arm 15 on the other side of said portion. The bow 16 of the bridle ring 13 is then compressed until the hook 17 snaps into the opening 7.

Figure 3:
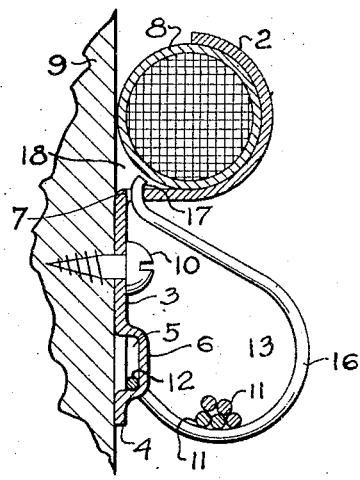
Fig. 3 is a vertical section through the conduit and cable clamp shown in Fig. 2.
Figure 4:
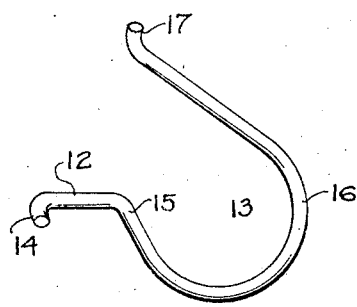
Fig. 4 is a perspective view of one form of wire bridle ring which I may employ.

In this position of the parts there is no lateral or vertical play of the bridle ring with relation to the cable or conduit clamp 1. The parts are immovable and consequently there is no rattling. The hook 17 extends up into the dead space 18, Fig. 3, so that it does not touch, cut, scratch or mar the cable 8.

Should it ever be desirable to remove the bridle wires 11, 11 this can easily be done by compressing the bow 16 of the wire bridle ring 13 until the hook 17 is released from the opening 7. The hook 12 can then be readily removed from the socket 5 by raising it slightly to free the locking arm 14 and then removing the entire hook 12 laterally. The bridle ring 13 can then be used in some other location with a similar conduit or cable hanger. Of course, my bridle ring may be used without the locking arm 14.

It will be noted that in my improved construction no tapping or screw-threading of the conduit or cable clamp is required, nor is it necessary to place screw-threads upon my bridle ring. This of course, saves considerable expense in the manufacture of the article and reduces the amount of metal necessary to make the conduit or cable clamp.

Having thus described this invention in connection with an illustrative embodiment thereof, to the details of which I do not desire to be limited, what is claimed as new and what is desired to secure by Letters Patent is set forth in the appended claims.

What I claim is:—

1. The combination of a conduit or cable clamp formed from pressed sheet material having a hook portion and a base, the clamp being provided with means to engage with one end of a bridle ring, the base having a longitudinally extending portion struck up to form a pocket or recess extending longitudinally of the conduit or cable clamp and provided with open sides, and a bridle ring having a hook at one end coöperating with the securing means on the conduit or cable clamp, a second hook on the other end of the bridle ring provided with an arm coöperating with the pocket or recess on the base.

2. The combination of a conduit or cable clamp formed from pressed sheet material having a hook portion and a base, the clamp being provided with means to engage with one end of a bridle ring, the base having a longitudinally extending portion struck up to form a pocket or recess extending longitudinally of the conduit or cable clamp and provided with open sides, and a wire bridle ring having one end bent to form a hook to coöperate with the securing means on the conduit or cable clamp, its other end being bent to form a hook substantially at right angles to the plane of the bridle ring said hook being adapted to be threaded laterally into the pocket or recess formed on the base.

3. A new article of manufacture comprising a bridle ring having a bow and a hook at one end arranged in the same plane as the bow, the other end being provided with a second hook substantially at right angles to the bow and in a different plane from the bow and the first hook.

4. A new article of manufacture comprising a bridle ring having a bow and a hook at one end arranged in the same plane as the bow, the other end being provided with a second hook substantially at right angles to the bow and in a different plane from the bow and the first hook, the second hook being provided at its end with a locking arm.

5. A new article of manufacture comprising a wire bridle ring having a vertical hook at one end formed by bending the wire back on itself, the other end being bent at substantially right angles to the bow of the bridle ring to form a horizontal hook, said hook being in a different plane from the bow.

6. A new article of manufacture comprising a wire bridle ring having a vertical hook at one end formed by bending the wire back on itself, the other end being bent at substantially right angles to the bow of the bridle ring to form a horizontal hook, said hook being in a different plane from the bow, the end of the hook being further bent at an angle to form a locking arm.

HENRY W. PLEISTER.

Witnesses:
 MARY R. RYAN,
 A. M. WILLIAMS.